United States Patent
Nando et al.

(10) Patent No.: US 8,389,638 B2
(45) Date of Patent: Mar. 5, 2013

(54) MULTIFUNCTIONAL ADDITIVE GRAFTED RUBBER AND PROCESS FOR THE PREPARATION THEREOF

(75) Inventors: Golok Bihari Nando, West Bengal (IN); Tiruchanur Vikram, West Bengal (IN)

(73) Assignee: Council of Scientific and Industrial Research, New Delhi (IN)

( * ) Notice: Subject to any disclaimer, the term of this patent is extended or adjusted under 35 U.S.C. 154(b) by 978 days.

(21) Appl. No.: 10/572,596

(22) PCT Filed: Nov. 22, 2005

(86) PCT No.: PCT/IN2005/000371
§ 371 (c)(1),
(2), (4) Date: Nov. 14, 2008

(87) PCT Pub. No.: WO2007/060677
PCT Pub. Date: May 31, 2007

(65) Prior Publication Data
US 2009/0062474 A1 Mar. 5, 2009

(51) Int. Cl.
*C08C 19/28* (2006.01)
(52) U.S. Cl. ........ 525/264; 525/242; 525/244; 525/263; 525/265; 525/298; 525/329.3; 525/331.9; 525/332.9; 525/333.1; 525/333.2; 525/340; 525/383; 525/384; 525/387
(58) Field of Classification Search ............... 525/242, 525/244, 263, 264, 265, 298, 329.3, 331.9, 525/332.9, 333.1, 333.2, 340, 383, 384, 387
See application file for complete search history.

(56) References Cited

U.S. PATENT DOCUMENTS
4,155,955 A  5/1979  Parks

FOREIGN PATENT DOCUMENTS
GB  1 523 076  8/1978
GB  1523076  *  8/1978

OTHER PUBLICATIONS http://www.wallaceinstruments.co.uk/products/plasticity/p14.htm, Dec. 2011.*
Menon, et al., "Vulcanization of natural rubber modified with cashew nut shell liquid and its phosphorylated derivative—a comparative study" Polymer, vol. 39, No. 17, pp. 4033-4036, XP002386543, 1998.
Menon, "Melt-rheology of Natural Rubber Modified with Phosphorylated Cashew Nut Shell Liquid Prepolymer—A Comparative Study with Spindle Oil", Iranian Polymer Journal, vol. 8, No. 3, pp. 167-173, XP002386542, 1999.

* cited by examiner

*Primary Examiner* — Roberto Rabago
(74) *Attorney, Agent, or Firm* — Oblon, Spivak, McClelland, Maier & Neustadt, L.L.P.

(57) ABSTRACT

The present invention relates to a novel multi functional additive grafted rubber. More particularly the present invention relates to novel grades of rubber and in particular to chemically grafted with cardanol (meta-penta decenyl phenol) and/or its derivatives. Importantly the rubber grades of the invention involve chemically anchored/grafted selective meta alkenyl phenol and/or its derivatives in the backbone of natural or synthetic rubber. Importantly, such rubber variant of the invention have high plasticity, lower Mooney and melt viscosities, better cure properties as compared to conventional virgin natural rubber or natural rubber plasticized with aromatic process oils.

17 Claims, No Drawings

MULTIFUNCTIONAL ADDITIVE GRAFTED RUBBER AND PROCESS FOR THE PREPARATION THEREOF

FIELD OF THE INVENTION

The present invention relates to a novel multi functional additive grafted rubber. More particularly the present invention relates to novel grades of rubber and in particular to chemically grafted with cardanol (meta-penta decenyl phenol) and/or its derivatives. Importantly the rubber grades of the invention involve chemically anchored/grafted selective meta alkenyl phenol and/or its derivatives in the backbone of natural or synthetic rubber. Importantly, such rubber variant of the invention have high plasticity, lower Mooney and melt viscosities, better cure properties as compared to conventional virgin natural rubber or natural rubber plasticised with aromatic process oils. Moreover, upon vulcanization the above grafted rubber is found to have improved end use properties such as superior tensile properties, better ageing resistance and higher flame retardancy. The invention also relates to a simple and cost-effective manner of manufacture of superior grade of grafted rubber with easy process ability and improved end-use characteristics.

BACKGROUND ART

Natural Rubber is well known to be a tough and nervy polymer. Mastication is a must for natural rubber prior to its compounding. Quite often a peptizer is required to be added to bring down its viscosity. During mixing of the rubber with large amounts of fillers, a plasticizer is essential to ease processing and facilitate dispersion of fillers in rubber. Usually it is know to add plasticizer during compounding either on the mixing mill or in the internal mixer i.e., Banbury, which is cumbersome. The plasticizer is basically hydrocarbon based. Because of the depletion of petroleum based natural sources day-by-day, there is a constant search for alternative resources of material. Renewable resources, which are agricultural and forest based, are supposed to play a significant role as such alternative sources of energy for industrial application in future.

The multi functional additive role of cardanol produced by double vacuum distillation of cashew nut shell liquid (CNSL) a by product from the Cashew Cultivation, which is basically a mix of alkenyl phenols is well known. In particular such Cardanol is known to have the following multi-functional additive characteristics when added to rubber:— a) The Cardanol act as good plasticiser by way of increasing plasticity and reducing the viscosity of the rubber compounds and aid in processing of the rubber in mixing mills, internal mixers, during calendaring, extrusion and injection molding. This enhances the output rate. Also the torque required is less for the plasticized rubber than that for unplasticised one. Thus power consumption in processing is also reduced.

b) The additive is also known to act as a cure promoter and thus reduces the cure time. This improvement is very significant from the production point of view as it leads to enhanced industrial throughput thus saving labour, power and hence money.

c) The additive enhances mechanical strength properties such as tensile, tear, flex and abrasion resistance. It results in rubber products, which can withstand higher loads and also successfully resist tear during use.

d) The additive is further known to act as good antioxidant and is supposed to assist in air-ageing resistance. Antioxidants are a must for the rubber compounds especially for the diene rubbers. Cardanol being phenolic in nature is expected to have certain anti-oxidant properties and are comparable with amine type anti-oxidants.

e) The additive is also known to aid in better filler dispersion in rubber matrix and enhance rubber-filler interaction and consequentially the mechanical strength properties are improved.

f) Moreover, the phosphorylated derivatives of Cardanol (PCP) act as mild fire retardant.

While the above reveal the multi functional additive advantages of CNSL/Cardanol and its phosphorylated derivatives in rubber compounding, there has been some inherent problems in compatibility of Cardanol or its derivatives with respect to rubber. Importantly, it is found that when Cardanol or its derivatives such as PCP are added directly onto the Rubber, on the mixing mill, rubber gets crumbled down and falls down on to the tray. It is thus difficult to handle such material. Moreover, the mixing get delayed, imperfect and there is loss of expensive material. Added to the above, due to such problems of compatibility of such Cardanol in rubber the processing of rubber involve more than usual processing time in the mill which again is complex, time consuming and obviously also cost extensive. Apart from the above complexities involved in the processing of rubber involving the use of Cardanol the incompatibility of the additive when directly added to the rubber base is further shown by the fact that even after physical blending the additive leaches out during storage and use. The aforesaid, therefore, demonstrate the complexities involved in proper and effective use of the multi functional additive role of Cardanol and its phosphorylated derivatives in rubber compounding. Accordingly, therefore, in spite of the presently known multi functional additive characteristics of Cardanol and its phosphorylated derivatives it has not been possible to make effective and proper use of such additive characteristics of Cardanol and its phosphorylated derivatives either in relation to processing and/or obtaining rubber of desired improved characteristics.

The closest related prior art may be given as below:

In the U.S. Pat. No. 1,819,416), M. T. Harvey et al. have claimed the novel use of Cashew Nut Shell Liquid as a physically added additive that improves the moisture resistance of the rubber. Hence the use of such rubber composition in electrical insulation. The present invention deals with chemical grafting of cardanol/its derivative onto the rubber main chain which makes it an integral part of the rubber there by imparting inherent Multi Functional Additive characteristics to the rubber.

The phosphorylated derivatives of cardanol known as PCP (Anorin-38) is found to behave as a multifunctional additives (when physically added to rubber during compounding) by A. R. R Menon, C. K. S. Pillai and G. B. Nando in 1992 (Ref: 1-11)

1) Rheology of phosphorylated cashew nut shell liquid prepolymer modified natural rubber. Menon, A. R. R.; Pillai, C. K. S.; Bhattacharya, A. K.; Nando, G. B.; Gupta, B. R., Kautschuk Gummi Kunststoffe (2000), 53(1-2), 35-41.

2) Cure characteristics and physicomechanical properties of natural rubber modified with phosphorylated cashew nut shell liquid prepolymer—a comparison with aromatic oil. Menon, A. R. R.; Pillai, C. K. S.; Nando, G. B. Journal of Applied Polymer Science (1999), 73(5), 813-818.

3) Modification of natural rubber with phosphatic plasticizers: a comparison of phosphorylated cashew nut shell liquid prepolymer with 2-ethylhexyl diphenyl phosphate. Menon, A. R. R.; Pillai, C. K. S.; Nando, G. B. European Polymer Journal (1998), 34(7), 923-929.

4) Vulcanization of natural rubber modified with cashew nut shell liquid and its phosphorylated derivative—a comparative study. Menon, A. R. R.; Pillai, C. K. S.; Nando, G. B. Polymer (1998), 39(17), 4033-4036.
5) Physicomechanical properties of filled natural rubber vulcanizates modified with phosphorylated cashew nut shell liquid. Menon, A. R. R.; Pillai, C. K. S.; Nando, G. B. Journal of Applied Polymer Science (1998), 68(8), 1303-1311.
6) Self-adhesion of natural rubber modified with phosphorylated cashew nut shell liquid. Menon, A. R. R.; Pillai, C. K. S.; Nando G. B. Journal of Adhesion Science and Technology (1995), 9(4), 443-51.
7) Rheological studies on blends of natural rubber and phosphorylated cashew nut shell liquid. Menon, A. R. R.; Pillai, C. K. S.; Bhattacharya, A. K.; Nando, G. B. Polym. Sect., Editor(s): Bhardwaj, I. S. Polym. Sci. (1994), 2, 657-61.
8) Effect of phosphorylated cashew nutshell liquid on the physicomechanical properties of natural rubber vulcanizates. Menon, A. R. R.; Pillai, C. K. S.; Nando, G. B. Kautschuk Gummi Kunststoffe (1992), 45(9), 708-11.
9) Phosphorylated cashew nut shell liquid prepolymer—a novel multifunctional additive for rubber compounding. Menon, A. R. R.; Pillai, C. K. S.; Nando, G. B. Metals, Materials and Processes (2001), 13(2-4), 179-190.
10) Chemical crosslink density and network structure of natural rubber vulcanizates modified with phosphorylated cardanol prepolymer. Menon, A. R. R.; Pillai, C. K. S.; Nando, G. B. Journal of Applied Polymer Science (1994), 51(13), 2157-64.
11) Thermal degradation characteristics of natural rubber vulcanizates modified with phosphorylated cashew nut shell liquid. Menon, A. R. R.; Pillai, C. K. S.; Nando, G. B. Polymer Degradation and Stability (1996), 52(3), 265-271.
12) U.S. Pat. No. 5,916,850; dated 29 Jun. 1999.
13) US patent No: 2002/0128159 A1; dated 12 Sep. 2002.
14) Charmondusit, Kitikorn; Kiatkamjornwong, Suda; Prasassarakich, Pattarapan. Journal of Scientific Research of Chulalongkorn University (1998), 23(2), 167-181.
15) Thai, Hoang; Park, Jong-Gu.; Tap Chi Hoa Hoc (2000), 38(2), 81-87, 96.
16) John, George; Pillai, C. K. S.; Polymer Bulletin (Berlin, Germany) (1989), 22(1), 89-94.

Multifunctional activity of phosphoridithionic acid derivatives of saturated and unsaturated CNSL has been patented by Krishna Kumar Swamy and Deepak Kumar Tuli et al in 2002 and 1999 respectively (Ref: 12-13). These patents are completely different from what is being claimed in the present patent application.

The knowledge of multifunctional additive of cardanol and its derivatives is new and was revealed by Menon and Nando who proved by research in the last few years that it can perform various functions in rubbers as an additive (Ref: 1-11).

The idea of grafting is novel to this work and was implemented by the inventors. The multifunctional additive term for cardanol and its derivatives was assigned by Prof. G. B. Nando and his coworkers. This idea is novel and akin to Nando and his group. Also the voluminous work on cardanol and its derivatives as monomers, additives and raw materials were carried out by earlier workers from only a chemist's view point. The idea of grafting cardanol and its derivative, thereby generating new grades of rubbers has been carried out from a technologist's view point.

Since cardanol itself doesn't form easily a homopolymer but an oligomer of 4 units, the idea of graft copolymer has been ruled out. But, the potential benefits of grafting single molecules and oligomers of cardanol onto the rubber backbone has been realized by the inventors in the year 1998 and thus this novel idea has been implemented in the Rubber Technology Centre laboratory after grant of this project by from CSIR in the year 2001.

The novelty of the present invention lies in tapping the potential benefits of chemically anchoring cardanol and its derivative to the rubber backbone. We would like to emphasize that no prior art is closer to this idea. The prior art related to cardanol is only about adding physically Cardanol as an additive in rubber compounding or making use of Cardanol in manufacturing cardanol-formaldehyde resins which are used as friction materials. Coming to the prior art related to grafting onto rubber, the literature is replete with examples of preparation of graft copolymers with Methyl methacrylate, styrene and other vinyl monomers onto the rubber. The purpose of making graft copolymer varies from rubber to rubber and monomer to monomer. Till date, no literature is available regarding grafting of cardanol onto rubber.

U.S. Pat. No. 4,526,579 deals with the process for grafting a hydrophilic polymer of a carboxylic acid or a salt thereof onto the surface of a natural rubber article by contacting said article in reaction in inert solvent with a vinyl carboxylic acid anhydride and initiator, and subsequent washing and hydrolysis of anhydride groups to carboxylate groups and an article when prepared by the invention process.

U.S. Pat. No. 4,230,833 deals with single stage process comprising continuously introducing a solution of synthetic rubber in a monomer system comprising methyl methacrylate into a single reactor in the presence of a free radical initiator, continuously stirring said solution to create a turbulent flow, controlling the temperature at about 161 to 195° C., controlling the average residence time to below 90 minutes and continuously removing the resultant graft polymer having a dispersed rubber phase and a continuous hard phase from said reactor.

U.S. Pat. No. 3,954,911 deals with preparation of novel high impact plastics by the inclusion of 2 to 30 weight percent of chlorobutyl rubber in polymers of styrene and styrene-acrylonitrile and the grafting of said polymers onto said rubber. The graft copolymers are obtained by polymerizing the monomers of styrene or styrene-acrylonitrile in the presence of the chlorobutyl rubber, which is preferably precrosslinked.

U.S. Pat. No. 3,944,630 deals with preparation of an impact resistant plastic graft copolymer composition by agglomerating 100 parts by weight in terms of the solids content of a synthetic rubber latex (A) containing small-sized rubber particles by adding 0.1-5 parts by weight, in terms of the solids content of a carboxylic acid containing copolymer latex (B) having a pH of at least 4, said copolymer latex being prepared by polymerizing a mixture of monomers comprising 5-20% by weight of at least one monomer selected from the group consisting of acrylic acid, methacrylic acid, itaconic acid and crotonic acid and 95-80% by weight of alkyl acrylate having 1 to 12 carbon atoms in the alkyl group, in the presence of at least one anionic emulsifier, and adjusting the pH of the mixed latexes (A) and (B) to not less than 6, stabilizing the agglomerated latex with at least one nonionic emulsifier, and grafting 93-30 parts by weight of a monomer or mixture of monomers, which is capable of producing a glassy thermoplastic polymer having a glass transition temperature of not less than 50° C. in the presence of or onto 7-70 parts by weight in terms of solids content of the agglomerated and stabilized synthetic rubber latex.

A French patent No: 1438700 deals with the method of graft copolymerizing olefins onto natural or synthetic rubbers to give polymers with increased transparency, impact resistance, and rigidity and the factors controlling the improvements in transparency and impact resistance are the size of the rubber particles and the presence of a coagulant.

U.S. Pat. No. 5,232,748 deals with the method of grafting monomers or prepolymers onto nonmetallic substrates, e.g., cellophane, comprises activating the substrate by contacting it with a solution of $AgNO_3$ and precipitating. $Ag_2O$ or colloidal Ag by an alkali hydroxide, whereby particles of Ag or $Ag_2O$ are uniformly distributed in situ throughout the surface of the substrate, contacting the treated substrate with a polymerizable compound containing monomers to effect graft polymerization, and curing the polymer by microwave or laser energy. A cellophane sheet was preactivated by dipping in aqueous $AgNO_3$ and then in aqueous KOH solutions, was then treated with an aqueous solution containing hydroxyethyl methacrylate and acrylonitrile, air-dried, and cured in microwave to give a grafted film showing wt. gain of 20.58%, compared with 2.63% for a similarly grafted film without preactivation.

Thiraphattaraphun et al. (Ref: 14) have reported the graft copolymerization of Methyl Methacrylate and styrene onto natural rubber in an emulsion process at various concentrations of monomers, emulsifier, initiator, and reaction temp. The grafting efficiency, graft ratio, and monomer conversion were reported. Thai et al. (Ref: 15) have reported the graft polymerization of styrene onto ethylene-propylene-diene monomer (EPDM) rubber containing 5-methylene-2-norbornene as the termonomer. The suitable conditions for graft polymerization were found to be a reaction time of 40 h; a reaction temperature of 80° C.; an initiator concentration of 3 wt. %; and toluene as a solvent. Pillai et al (Ref: 16) have grafted Cardanol onto cellulose (filter paper) using BF3.Et2O as carbocationic initiator. The graft yield of 15-25% was reported within 2 h without significant gelation of the monomer. Extensive water repellency was shown by Whatman No. 1 filter paper after the grafting reaction.

OBJECTS OF INVENTION

The main objective of the present invention is to provide novel grades rubber involving the advantageous multi functional additive characteristic of Cardanol and its phosphorylated derivatives avoiding the problems of non-compatibility of Cardanol in relation to the base rubber.

Another object of the present invention is to advantageously selectively incorporate the multi functional additive role of Cardanol and its phosphorylated derivatives in rubber which would facilitate rubber compounding and production of new grades of rubber with easy process ability and improved storage stable end characteristics.

Yet another objective of the present invention is to structurally modify rubber and provide for a selective multi functional additive in rubber which could act as good plasticizer by way of increasing plasticity and reducing the viscosity of the rubber compound and in the process aid in processing of the rubber such as in mixing mills, internal mixers, during calendaring, excursion and injection molding.

Yet another object of the present invention is to provide for an additive bonded compounding of rubber with enhanced output rate and with low power consumption.

Yet another object of the present invention is to provide for a multi functional additive grafted rubber/rubber based products which would enable faster processing and curing of the rubber and enhanced industrial throughput saving labor, power and money during processing and also enable obtaining rubber/rubber products of improved quality and characteristics.

Yet another objective of the present invention is to provide higher tack property to the rubber for aiding during building operation of green rubber products.

Yet another objective is directed to provide rubber/rubber products with enhanced mechanical strength property such as tensile and tear flex and abrasion resistance and provide for a rubber product adapted to withstand higher loads and successfully resist tear during use.

Yet another object is to provide an improvement in rubber characteristics by way of improving ageing resistance and thereby impart versatility to rubber and its products and provide for a more diversified and effective use and application of rubber/its products.

Yet another object is to provide for a simple but cost effective manner of processing of rubber which would aid in better filler dispersion in rubber matrix thereby enhancing the much required rubber-filler interaction and consequential improvement in the uniformity and end characteristics of variety of grades of rubber/rubber products.

Yet another object is directed to provide new variety of rubber/rubber products having effectively bond Cardanol or its derivatives which would impart a) increased plasticity b) reduced viscosity c) superior tensile properties d) better ageing resistance e) higher flame retardancy and f) enhanced cure properties to rubber/rubber products maintaining non-volatile and environment friendly characteristics.

Still another object of the present invention is to incorporate anti-bacterial properties in rubber and rubber based products without affecting the process ability and required advantageous product characteristics targeted above.

SUMMARY OF THE INVENTION

Accordingly the present invention provides a novel multi functional additive grafted rubber having the general formula

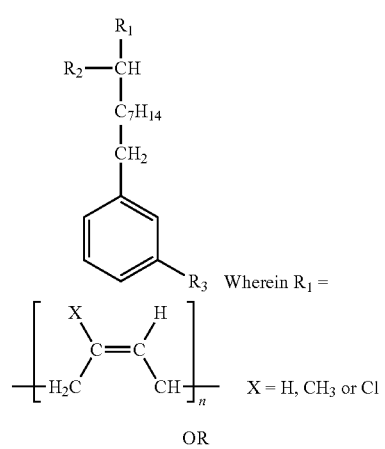

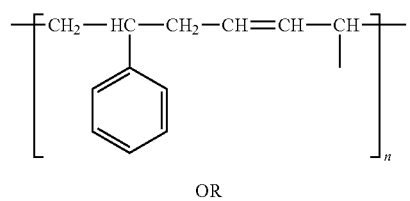

OR

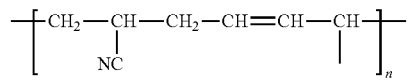

$R_2$ is selected from $C_6H_{13}$, $C_6H_{11}$ and $C_6H_9$
$R_3$ is selected from OH and $H_2PO_4$ In an embodiment of the present invention the novel grafted rubber obtained has the following characteristics
a) plasticity in the range of 57-59
b) viscosity in the range of 35-43
c) superior tensile properties in comparison to natural and synthetic rubber
d) better ageing resistance in comparison to natural and synthetic rubber
e) higher flame retardancy in comparison to natural and synthetic rubber and
f) enhanced cure properties in comparison to natural and synthetic rubber.

In yet another embodiment the novel multifunctional additive grafted rubber obtained comprises natural rubber or a synthetic diene rubber chemically grafted with cardanol or its phosphorylated derivative.

In yet another embodiment the natural rubber used is cis-1,4 polyisoprene rubber.

In yet another embodiment the synthetic rubber used is selected from the group consisting of styrene butadiene rubber, poly chloroprene rubber, poly butadiene rubber, butadiene acrylonitrile rubber and phosphorylated or chlorinated derivatives of cardanol.

In yet another embodiment the cardanol used is cardanol isolated from cashew nut shell liquid (CNSL) or commercially available cardanol.

The present invention further provides a process for the preparation of a novel multi functional additive grafted rubber having the general formula

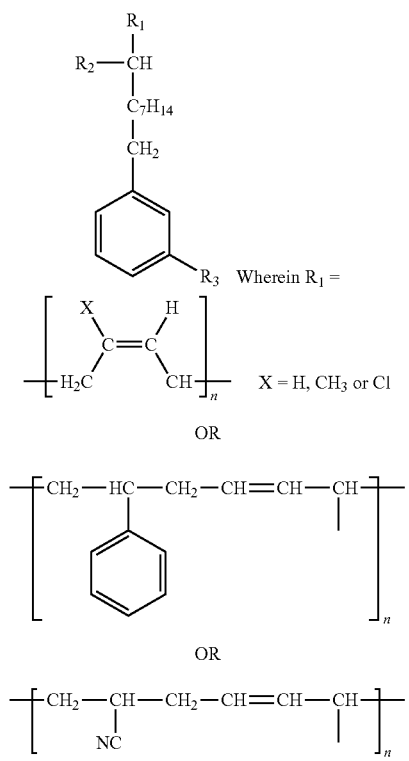

$n = ?$
$R_2$ is selected from $C_6H_{13}$, $C_6H_{11}$ and $C_6H_9$
$R_3$ is selected from OH and $H_2PO_4$ which comprises grafting natural or synthetic rubber with cardanol or phophorylated cardanol by solution, solid state or latex grafting, in the presence of free radical initiator, at a temperature in the range of 25-150° C., to obtain the desired product.

In yet another embodiment the solution grafting of natural or synthetic rubber with cardanol or phophorylated cardanol comprises reacting CNSL or cardanol or its derivative with syntetic or natural rubber in an organic solvent, in the presence of an initiator, at a temperature in the range of 50-80° C., under stirring, for a period of 8-20 hrs, followed by precipitating the resultant grafted rubber by adding an organic solvent, drying in vacuum at a temperature of 70-100° C. to obtain the desired product.

In yet another embodiment the organic solvent used is methanol

In yet another embodiment the solid state grafting of natural or synthetic rubber with cardanol or phophorylated cardanol comprises reacting CSNL or cardanol/its derivative with rubber in molten stage, in the presence of an initiator, at a temperature of 120-150° C., for a period of 1-2 hrs, followed by quenching the above said reaction at a temperature of about 0° C. and extracting the desired product by known method.

In yet another embodiment the latex grafting of natural or synthetic rubber with cardanol or phophorylated cardanol comprises reacting CNSL or cardanol or its derivative emulsion with latex, in the presence of an initiator, at a temperature in the range of 20-30° C. for a period of about 24 hrs, followed by coagulating the resultant grafted rubber, drying in vacuum, at a temperature of 70-100° C. and finally extracting the desired grafted rubber with an organic solvent.

In yet another embodiment the organic solvent used is methanol.

In yet another embodiment the free radical initiator used is selected from benzoyl peroxide and ammonium per sulphate.

In yet another embodiment the natural rubber used is cis-1,4 polyisoprene rubber.

In yet another embodiment the synthetic rubber used is selected from the group consisting of styrene butadiene rubber, poly chloroprene rubber, poly butadiene rubber, butadiene acrylonitrile rubber and phosphorylated or chlorinated derivatives of cardanol.

In yet another embodiment the cardanol used is cardanol isolated from cashew nut shell liquid (CNSL) or commercially available cardanol.

In still another embodiment the grafting attained is in the range of 10-60%.

DETAILED DESCRIPTION OF THE INVENTION

Thus according to the basic aspect of the present invention there is provided rubber grafted with multi functional additive comprising at least one multi functional additive selected from Cardanol and its phosphorylated derivatives grafted to natural or synthetic rubber such as to impart at least one of benefit characteristics comprising of (a) increased plasticity (b) reduced viscosity (c) superior tensile properties (d) better ageing resistance (e) higher flame retardancy and (f) enhanced cure properties.

In accordance with a preferred aspect of the present invention there is provided rubber grafted with multi functional additive comprising at least one multi functional additive selected from Cardanol and its phosphorylated derivatives grafted to the backbone of natural or synthetic rubber such as to impart at least one of benefit characteristics comprising of (a) increased plasticity (b) reduced viscosity (c) superior tensile properties (d) better ageing resistance (e) higher flame retardancy and (f) enhanced cure properties.

According to another aspect of the present invention there is provided a rubber product comprising of rubber grafted with multi functional additive comprising at least one multi functional additive selected from Cardanol and its phosphorylated derivatives grafted to natural or synthetic rubber such as to impart at least one of benefit characteristics comprising of (a) increased plasticity (b) reduced viscosity (c) superior tensile properties (d) better ageing resistance (e) higher flame retardancy and (f) enhanced cure properties.

In accordance with a preferred aspect of the present invention the rubber product comprise rubber grafted with multi functional additive comprising at least one multi functional additive selected from Cardanol and its phosphorylated derivatives grafted to the backbone of natural or synthetic rubber such as to impart at least one of benefit characteristics comprising of (a) increased plasticity (b) reduced viscosity (c) superior tensile properties (d) better ageing resistance (e) higher flame retardancy and (f) enhanced cure properties.

Importantly in above disclosed rubber/rubber product involving rubber grafted with multi functional additive of the invention, the same comprises of chemically grafted Cardanol and its derivatives (PCP) on to the natural rubber and/or synthetic rubber backbone.

In accordance with an aspect of the present invention, the grafted rubber/rubber product comprise of grafted natural rubber, styrene butadiene rubber and other diene ribbers having the general structure as provided hereunder of Formula 1a.

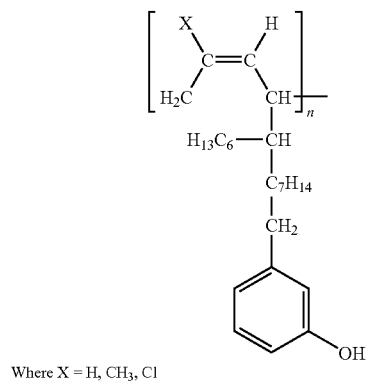

Formula 1a

Where X = H, CH$_3$, Cl

As would be evident from the Formula 1a above, the grafting of cardano and its derivatives may occur onto the NR back bone, SBR back bone, CR back bone, NBR back bone and Poly butadiene back bone. Accordingly the natural rubber is shown grafted with the monoene component of Cardanol.

In accordance with another aspect of the present invention, the grafted rubber/rubber product comprise of grafted natural rubber having the structure as provided hereunder of Formula 1b.

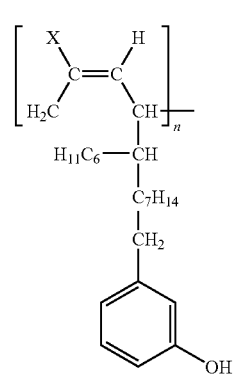

Formula 1b

Where X = H, CH$_3$, Cl

As would be evident from the Formula 1b above, the grafted rubber of the invention comprise natural rubber grafted with the diene component of Cardanol.

In accordance with another aspect of the present invention, the grafted rubber comprise of grafted natural rubber having the structure as provided hereunder of Formula 1c.

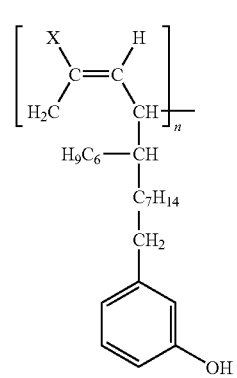

Formula 1c

Where X = H, CH$_3$, Cl

As would be evident from the Formula 1c, the grafted natural rubber is shown grafted with the triene component of Cardanol.

Likewise the grafting in the natural rubber backbone it is also possible to graft the CSNL/Cardanol or its derivatives such as PCP in the synthetic rubber backbone such as that of Styrene Butadiene Rubber.

In accordance with another aspect of the present invention, the grafted rubber comprise of grafted styrene butadiene rubber having the structure as provided hereunder of Formula 2a.

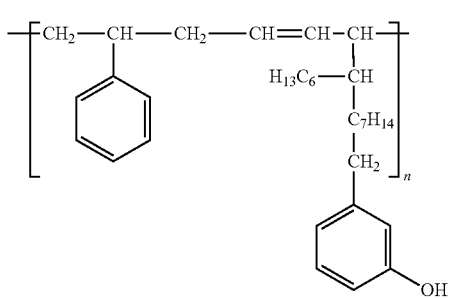

Formula 2a

As would be evident from the Formula 2a, the grafted styrene butadiene rubber is shown grafted with the monoene component of Cardanol.

In accordance with another aspect of the present invention, the grafted rubber comprise of grafted styrene butadiene rubber having the structure as provided hereunder of Formula 2b.

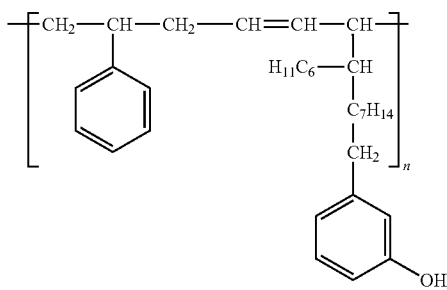

Formula 2b

As would be evident from the Formula 2b, the grafted styrene butadiene rubber is shown grafted with the diene component of Cardanol.

In accordance with another aspect of the present invention, the grafted rubber comprise of grafted styrene butadiene rubber having the structure as provided hereunder of Formula 2c.

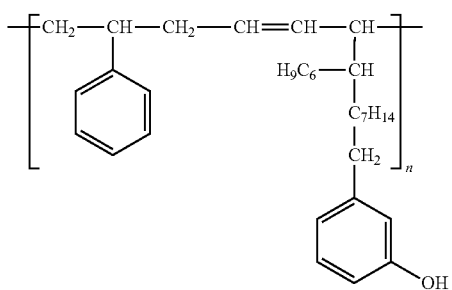

Formula 2c

As would be evident from the Formula 2c, the grafted styrene butadiene rubber is shown grafted with the triene component of Cardanol.

The grafted rubber of the invention would thus involve chemical grafting of at least one of the Cardanol and its derivatives (PCP) on to the natural or synthetic rubber backbone.

In another aspect of the present invention, a diene rubber either NR, SBR, BR, NBR or CR is grafted with cardanol or its derivatives having the general structure as shown in FIG. 3.

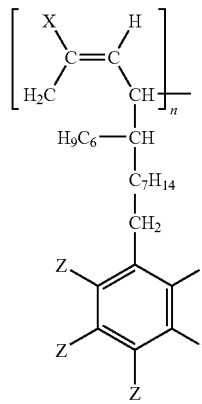

It is found that the grafted rubber where Y=OH, PO(OH)$_2$ and/or products including the same would avoid problems of non- Z=H, Br compatibility of Cardanol or its derivatives such as PCP when directly added to rubber. Importantly when Cardanol and its derivatives are grafted on to the rubber, it becomes an inherent part of the chain and hence, its handling problems are avoided and mixing on the mill becomes easy. There is thus no problem of the rubber getting crumble down and falling on to the tray and its difficulties in handling and processing. Also the grafted rubber takes care of problems of leaching out of the additive such as Cardanol or its derivatives during storage experienced in case of simple physical blending of the rubber and such additives.

Moreover, the Cardanol and its derivatives directly grafted to rubber is found to impart surprising and unexpected inherent plasticizing capability which avoids the need for any additional plasticizer or process oil for processing of the rubber whether in the mill or in the Banbury while especially compounding with reinforcing fillers such as carbon black.

Additionally, rubber in general and natural Rubber in particular needs mastication prior to addition of the fillers, plasticizer and curatives. The grafted rubber of the invention on the other hand is advantageously found not to require any such mastication step since its viscosity is already sufficiently low for filler incorporation. Such possible avoiding of mastication step during the processing of rubber further favour drastically reducing the mixing time and also no peptizer is required whereby time as well as the energy is saved.

Moreover, while providing for the above processing and cost advantages the grafted rubber of the invention also favours effective utilization of the multifunctional benefit properties of Cardanol and its derivatives in relation to rubber/rubber products by providing inherent characteristics to natural/synthetic rubber such as a) plasticizing capability b) ready curability c) enhanced mechanical strength such as tensile and tear flex and abrasion resistance d) air-ageing resistance e) anti-oxidant properties f) better filler dispersion and g) mild fire retardant characteristics.

Importantly, the effective grafting of Cardanol in rubber is further supposed to provide for a desired anti-bacterial property to rubber by way of the selective phenolic content —OH group to the grafted rubber which could impart the antibacterial properties to rubber.

Importantly, the grafted rubber can be based on any variety of virgin rubber selected from natural or synthetic rubber to obtain various grades of rubber. In particular, the conventional natural rubber available in various grades such as ISNR-5, 10,20,30 & 50 based on their dirt content, ass content, plasticity and so on can be used. Likewise various grades of RSS or RMA, Pale crepe deprotinised NR, Arctic rubber, SP Rubber, PMMA-g-NR, PS-g-NR, Resin grafted NR, Oil Extended NR, Constant Viscosity NR and epoxidised NR and the like art all suitable for grafting. Similarly, synthetic rubbers such as SBR is available as SBR-1502, SBR-1712, SBR-1800, SBR-1900, Oil extended SBR and so on which can also be grafted to obtain the new grades of rubber in accordance with the invention.

The Cardanol or its derivatives which is grafted with respect to the base Rubber is basically sourced from Cashew Nut Shell Liquid (CNSL) which is a mixture of Cardanol, Anacardic acid, 2-Methyl Cardol and Cardol. The components present in CNSL are given below.

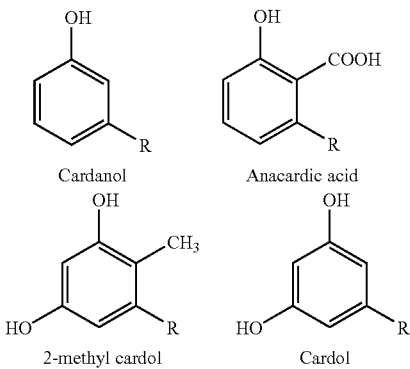

Where $R=C_{15}H_{31-n}$ n=0, 2, 4 & 6

However, in the said composition the Anacardic acid, which is the major proportion in CSNL, is found to be unstable and upon heating, it transforms to Cardanol and thereby the selective Cardanol constituent is made the major portion of CSNL. The Cardanol is recovered for the grafting purposes from CNSL by double vacuum distillation to obtain purer form of the Cardanol. However, it is also possible to use commercially available Cardanol for the grafting to rubber in accordance with the invention.

The Cardanol derivative such as the phosphorylated derivative (PCP) can also be used for the grafting. Such phosphorylated derivative (PCP) is illustrated in Formula 3 hereunder:—

Formula 3

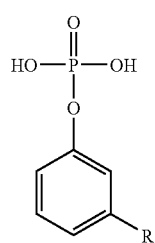

Where $R = C_{15}H_{31-n}$ n = 0, 1, 2 & 6

The phosphorylated derivatives can be obtained following conventional processes presently known in the art.

In accordance with another aspect of the present invention there is provided a process for the manufacture of grafted rubber comprising the steps of:—providing selectively any one of Cardanol and its phosphorylated derivatives; providing the rubber to be grafted; and carrying out the selective grafting of the Cardanol, its phosphorylated derivatives in rubber following any one or more of solution grafting, solid state grafting and latex grafting to produce the grafted rubber.

In accordance with an aspect of the present invention the process for the manufacture of the grafted rubber comprise solution grafting comprising the steps of:—dissolving rubber in a suitable solvent and Cardanol/its derivatives in solution and allowing the same to react with rubber in the presence of an initiator and in the process generating the grafted rubber therefrom.

In accordance with a preferred aspect, the above method of solution grafting of rubber comprises of:—dissolving rubber in a suitable solvent and Cardanol/its derivatives in solution and allowing the same to react with rubber in the presence of an initiator; pouring the reaction mixture into a selective methanol to precipitate out the rubber followed by drying and extracting with an organic solvent preferably methanol and finally further drying in vacuum at 70-100° C.

In the above process of invention, the percentage of grafting and grafting efficiency can be selectively controlled by following as hereunder:

$$\text{Grafting Efficiency}(GE\ \%) = \frac{\text{Wt. of Cardanol grafted} \times 100}{\text{Wt. of Cardanol charged}}$$

$$\text{Percent Grafting}(PG\ \%) = \frac{\text{Wt. of Cardanol grafted} \times 100}{\text{Wt. of grafted Rubber}}$$

In accordance with yet another aspect of the present invention, the manufacture of grafted rubber comprise solid state grafting comprising the steps of:—allowing Cardanol/its derivatives to react with rubber in the molten stage in an internal mixer to form the grafted rubber.

Preferably, during the reaction the grafting of the Cardanol to the Rubber is effectively controlled by maintaining selective pressure, temperature, and rotor speed and achieve desired percentage of grafting depending upon its intended end use/characteristics.

In accordance with yet further aspect of the present invention, the manufacture of the grafted rubber comprise a latex grafting comprising the steps of:—subjecting the Cardanol/its derivatives emulsion to react with latex in the presence of the initiator at selective temperature and period, followed by coagulating the grafted rubber from the latex, drying in vacuum for a period of 70-100° C. and finally extracting the grafted rubber with an organic solvent preferably methanol.

It is found by way of invention that maximum effective grafting was attended in the solution grafting where the maximum percent of grafting that could be achieved was up to 60%. However, the desired end properties of the grafted rubber can be found to be attained by way of grafting as little as 10-25%. Importantly, it was found that a percent grafting of 12% was sufficient to achieve the plasticization of rubber equal to the one plasticized with 7 phr of process oil. In addition imparting benefits of plasticization, the chemically bound Cardanol/its derivatives is found to impart significant further multi functional benefits to the grafted rubber which are superior to that oil plasticized rubber.

The following examples are given by the way of illustration and should not be construed to limit the scope of the invention

EXAMPLE I

Preparation of CGNR-12 by Solution Grafting.

5% NR solution in toluene was prepared by dissolving 20 g of ISNR-5 in 400 ml of toluene under constant stirring. 8.9 g of cardanol and 0.4 g free radical initiator (Benzoyl peroxide, 99% pure) were added to the natural rubber solution and stirred till a homogeneous mixture of the contents was obtained. The reaction was carried out at 70° C. and for 10 hours while stirring constantly after which the contents of the reaction vessel were poured into methanol in order to precipitate the CGNR. Precipitated CGNR was washed thoroughly with methanol followed by drying in the vacuum oven at 70° C. for 24 hrs to remove the residual solvent. The CGNR was extracted with methanol in soxhlet apparatus for 12 hrs to remove the ungrafted cardanol to obtain CNGR-12.
Percent grafting achieved=12%
Grafting efficiency achieved=35.5%

EXAMPLE II

Preparation of CGNR-12 by Melt Grafting.

40 g of ISNR-5 was introduced in the Brabender Plasticorder and masticated for 1 minute at 60 rpm speed followed by the addition of 12 g of cardanol at a rotor speed of 30 rpm. 0.4 g of benzoyl peroxide initiator was added and the reaction was carried out for period 8 minutes at a rotor speed of 60 rpm and a temperature of 140° C. The reaction was quenched by preserving the rubber at 0° C. for one hour prior to extraction in soxhlet apparatus with methanol as the solvent.
Percent grafting achieved=12%
Grafting efficiency achieved=42%

EXAMPLE III

Preparation of CGNR-12 by Latex Grafting.

100 g of 60% centrifuged, ammonia stabilized NR latex was diluted with distilled water to 55% Total Solids Content. The diluted latex was stabilized by adding 20 g of 25% aqueous solution of non-ionic surfactant Emulvin-W. The 12 g of 50% cardanol emulsion prepared with Emulvin-W as the emulsifier was added to the latex slowly over a period of 30 minutes under constant stirring. The latex solution was left under constant stirring for 6 hours for the cardanol to swell the rubber particles of the latex after which 0.6 g of ammonium persulfate initiator was added to the latex and the reaction was carried out for 24 hrs at 25° C. The modified latex was coagulated with 10% acetic acid solution and washed thoroughly with distilled water and the dried in the vacuum oven at 70° C. till constant weight. The CGNR thus prepared was extracted with methanol in soxhlet apparatus for 12 hrs to remove the ungrafted cardanol.
Percent grafting achieved=12%
Grafting efficiency achieved=55%

The following example deals with preparation of PCP grafted natural rubber. In this particular case, the percent grafting is 25%.

EXAMPLE IV

Preparation of PCPGNR-25

5% NR solution in toluene was prepared by dissolving 60 g of ISNR-5 in 1200 ml of toluene under constant stirring. Phosphorylated cardanol (PCP) solution (18 g of PCP in 50 ml of toluene) and 1.2 g free radical initiator (Benzoyl peroxide, 99% pure) were added to the natural rubber solution and stirred till a homogeneous mixture of the contents was obtained. The reaction was carried out at 80° C. and for 10 hours while stirring constantly after which the contents of the reaction vessel were poured into methanol in order to precipitate the PCPGNR. Precipitated PCPGNR was washed thoroughly with methanol followed by drying in the vacuum oven at 70° C. for 24 hrs to remove the residual solvent. The PCPGNR was extracted with methanol in soxhlet apparatus for 12 hrs to remove the ungrafted cardanol to obtain PCPGNR-25.
Percent grafting achieved=25%
Grafting efficiency achieved=41%

The following example deals with preparation of cardanol grafted Styrene Butadiene Rubber with a percent grafting of 12%.

EXAMPLE V

Preparation of CGSBR-12

5% SBR solution in toluene was prepared by dissolving 20 g of SBR-1502 in 400 ml of toluene under constant stirring. 4.24 g of Cardanol and 0.4 g free radical initiator (Benzoyl peroxide, 99% pure) were added to the styrene butadiene rubber solution and stirred till a homogeneous mixture of the contents was obtained. The reaction was carried out at 80° C. and for 6 hours while stirring constantly after which the contents of the reaction vessel were poured into methanol in order to precipitate the CGSBR. Precipitated CGSBR was washed thoroughly with methanol followed by drying in the vacuum oven at 70° C. for 24 hrs to remove the residual solvent. The CGSBR was extracted with methanol in soxhlet apparatus for 12 hrs to remove the ungrafted cardanol to obtain CGSBR-12.
Percent grafting achieved=12%
Grafting efficiency achieved=11%

The grafted rubber thus obtained in accordance with the present invention were next tested to ascertain its benefit characteristics/properties.

a) Plasticity:

Plasticity is an important criterion during rubber processing. Higher plasticity implies easy flow and better processibility of the rubber compounds. Conventionally, plasticizers are added to the rubber compound for ease in processing. But in case of grafted rubbers, there is no need to add extra plasticizers such as aromatic oils due to the plasticizing effect of cardanol or its derivatives when grafted onto the rubbers.

The plasticity number of the cardanol or phosphorylated cardanol grafted natural rubber obtained were compared with that of neat rubber and oil plasticized natural rubber.

For the purpose Wallace rapid plastimeter MK II was used for measuring the plasticity of the rubbers. Lower value of the plasticity number indicates higher plasticity and vice-versa. The results obtained are provided hereunder in Table 1

TABLE 1

| Sample Designation | NR | CGNR-12 | CGNR-25 | CGNR-60 | OPNR-3 | OPNR-5 | OPNR-7 |
| --- | --- | --- | --- | --- | --- | --- | --- |
| Plasticity No. (0.01 mm) | 67.5 | 62 | 56 | 47.5 | 59 | 57.5 | 57 |

CGNR-X: Cardanol grafted natural rubber where the percent grafting is X.
OPNR-Y: Aromatic oil plasticized natural rubber where the phr of oil is Y.

As would be evident from the results in table 1 above, grafted rubbers in accordance with the invention showed higher plasticity (indicated by the lower plasticity number) compared to that of virgin NR (ISNR-5). The CGNR-25 grade of grafted rubber almost matches with that of OPNR-7 (NR plasticized with 7 phr of aromatic process oil) in its plasticity.

Like wise the plasticity of the grafted synthetic rubber SBR vis-à-vis its usual ungrafted variety was also tested and the results are hereunder in Table 2:

TABLE 2

| | Sample Designation | | |
|---|---|---|---|
| | SBR 1502 | CGSBR-12 | CGSBR-25 |
| Plasticity No. (0.01 mm) | 58 | 54 | 50 |

As would be evident from the results under table 2 above, the plasticity of CGSBR of different grades was found to be more than the plasticity of the starting material, SBR 1502. Thus the plasticizing effect of Cardanol is found in synthetic rubbers also.

b) Viscosity
Mooney Viscosity:

When plasticity is increased, viscosity is expected to decrease. Similar behavior was observed in the present case of chemical plasticization by way of grafting cardanol onto NR.

The Mooney viscosity was measured by Mooney viscometer (Negretti Model) as per ASTM-D1646-97 with large rotor at 100° C. The viscosity value is reported as ML (1+4), 100° C.

The results obtained for natural rubber and synthetic rubber are reproduced in Tables 3A and 3B respectively hereunder:

TABLE 3A

| Sample Designation | NR | CGNR-12 | CGNR-25 | CGNR-60 | OPNR-3 | OPNR-5 | OPNR-7 |
|---|---|---|---|---|---|---|---|
| ML (1 + 4), 100° C. | 90 | 43 | 41 | 35 | 59 | 53 | 49 |

TABLE 3

| | Sample Designation | | |
|---|---|---|---|
| | SBR 1502 | CGSBR-12 | CGSBR-25 |
| ML (1 + 4), 100° C. | 52 | 50 | 47 |

As would be apparent from the above results, the plasticizing action of cardanol upon grafting to SBR backbone is evident from the reduction in the Mooney viscosity as given in the above table.

c) Cure promotion:

The cure behavior was obtained from Oscillating disc rheometer (Monsanto ODR-100S) at 150° C. for 30 minutes with an oscillating angle of 3°. Following recipe was used to make the rubber compound for cure behavior studies.

Mix A: Containing Natural rubber, 1 phr of amine type antioxidant and 7 phr of process oil.

Mix B: Containing CGNR-12, no antioxidant and no process oil. Cure characteristics of the two mixes are given below in Table 4.

TABLE 4

| | MIX A | MIX B |
|---|---|---|
| Optimum Cure time $t_{90}$ (min) | 6 min 22 sec | 5 min 30 sec |
| Cure rate $(\text{min}^{-1})$ | 33.33 | 45.45 |
| Scorch time (min) | 3 min 33 sec | 3 min 22 sec |
| Mooney Scorch Time (min) | 39.5 | 39 |

As would be apparent from the above results, in case of Mix B (containing CGNR-12 in place of ISNR-5), the cure rate was increased by 12 min-1 and the optimum cure time was reduced by nearly 1 minute compared to Mix A. This data proves the enhancement in cure properties in case of grafted rubbers.

d) Tensile Properties (Before and After Ageing):

Tensile specimens were punched out from the molded sheets of Mix A and Mix B and the tests were carried out as per the ASTM D 412-98 method in a universal testing machine (Hounsfield 10 KS) equipped with a with a 10 KN load cell at a crosshead speed of 500 mm/min at room temperature.

Tensile dumbbells punched out from the molded sheets were kept on aging for 24 hours at 100° C. in an air-aging oven. The samples were cooled to room temperature and left untouched for 12 hours.

The results are summarized below in Table 5:

TABLE 5

| Property | Mix A | Mix A (% Retention) | Mix B | Mix B (% Retention) |
|---|---|---|---|---|
| T.S (MPa) | 25 | 21% | 25 | 30% |
| E.B % | 826 | 27% | 825 | 36% |
| Tear Strength (N/mm) | 65 | 79% | 65 | 72% |

As apparent from the above results the tensile strength, tear strength and elongation at break of MIX B matched with that of MIX A. The retention of properties such as tensile strength and tear strength are more in case of MIX B.

e) Fire Retardant Characteristics of PCPGNR:

The phosphorylated derivative of cardanol, Anorin-38, has a Limiting Oxygen Index (LOI) value of 38 indicating its flame retardant nature. Hence, it is expected that the grafted product PCPGNR has the flame retardant nature inherent in it. The LOI of the raw NR and the PCP grafted NR was measured using Stanton-Redcroft flammability tester as per ASTM D-2863-77 and the results are summarized in the following Table 6:

TABLE 6

| | Percent grafting (PG %) | LOI |
|---|---|---|
| Natural Rubber | 0 | 16.8 |
| PCPGNR-5 | 5 | 17.1 |
| PCPGNR-15 | 15 | 18.2 |
| PCPGNR-25 | 25 | 19.2 |

As would be apparent from the above results there is an improvement in the flame retardancy of NR by grafting with Anorin-38 as indicated by the increase in LOI. PCPGNR-25, which contains 25% of Anorin-38, has an LOI of 19.2 which is 2.4 units more than raw NR.

It is thus possible by way of the present invention to provide new grades of rubber involving the advantageous multi functional additive characteristic of Cardanol and its phosphorylated derivatives avoiding the problems of non-compatibility of Cardanol in relation to the base rubber. The new grades of grafted rubber thus obtained have easy process ability and improved storage stable end characteristics. Importantly, the additive bonded compounding of rubber favour achieving enhanced output rate and with low power consumption.

The rubber/rubber products based on the grafted rubber achieve enhanced mechanical strength property such as tensile and tear flex and abrasion resistance and provide for a rubber product adapted to withstand higher loads and successfully resist tear during use. The ageing resistance further impart versatility to rubber and its products and along with non-volatile and environ friendly characteristics provide for a more diversified and effective use and application of rubber/ its products.

We claim:

1. A multi functional additive grafted rubber having the formula

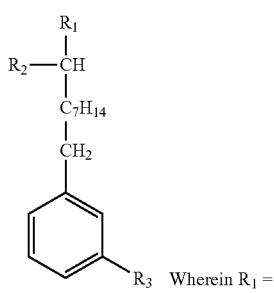 Wherein $R_1$ =

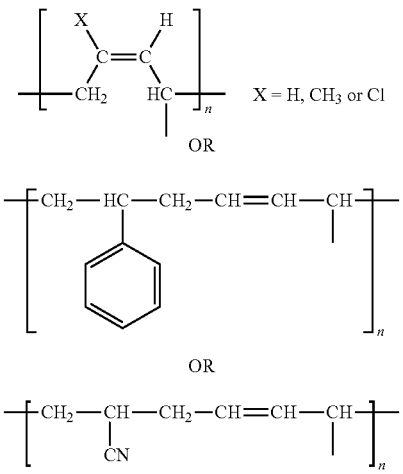

$R_2$ is selected from $C_6H_{13}$, $C_6H_{11}$ and $C_6H_9$ $R_3$ is selected from OH and $H_2PO_4$ wherein said grafted rubber has a viscosity in the range of 35-43.

2. A grafted rubber as claimed in claim 1 has a plasticity in the range of 57-59.

3. A multifunctional additive grafted rubber as claimed in claim 1, comprises natural rubber or a synthetic diene rubber chemically grafted with cardanol or its phosphorylated derivative.

4. A grafted rubber as claimed in claim 3, wherein the natural rubber used is cis-1,4 polyisoprene rubber.

5. A grafted rubber as claimed in claim 3, wherein the synthetic rubber used is selected from the group consisting of styrene butadiene rubber, poly chloroprene rubber, poly butadiene rubber, and butadiene acrylonitrile rubber.

6. A grafted rubber as claimed in the claim 3, wherein the cardanol used is cardanol isolated from cashew nut shell liquid (CNSL) or commercially available cardanol.

7. A process for the preparation of a multi functional additive grafted rubber having the formula

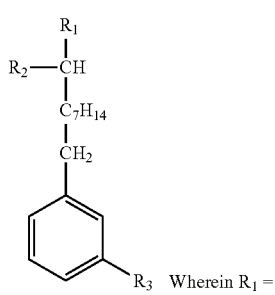 Wherein $R_1$ =

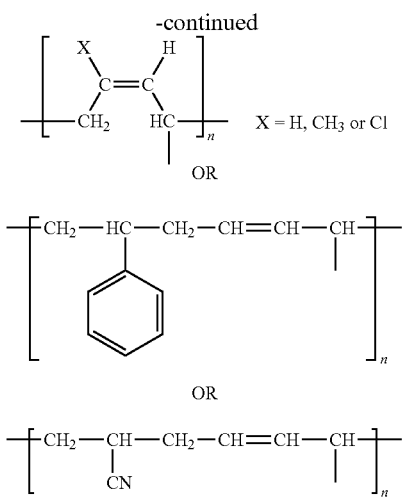

X = H, CH₃ or Cl $R_2$ is selected from $C_6H_{13}$, $C_6H_{11}$ and $C_6H_9$ $R_3$ is selected from OH and $H_2PO_4$ which comprises grafting natural or synthetic rubber with cardanol or phosphorylated cardanol by solution, solid state or latex grafting, in the presence of free radical initiator, at a temperature in the range of 25-150° C., wherein said grafted rubber has a viscosity in the range of 35-43.

8. A process as claimed in claim 7, wherein solution grafting of natural or synthetic rubber with cardanol or phosphorylated cardanol comprises reacting CNSL or cardanol or phosphorylated derivative of cardanol with synthetic or natural rubber in an organic solvent, in the presence of an initiator, at a temperature in the range of 50-80° C., under stirring, for a period of 8-20 hrs, followed by precipitating the resultant grafted rubber by adding an organic solvent, drying in vacuum at a temperature of 70-100° C.

9. A process as claimed in claim 8, wherein the organic solvent used is methanol.

10. A process as claimed in claim 7, wherein solid state grafting of natural or synthetic rubber with cardanol or phosphorylated cardanol comprises reacting CSNL or cardanol or phosphorylated cardanol with rubber in molten stage, in the presence of an initiator, at a temperature of 120-150° C., for a period of 1-2 hrs, followed by quenching the above said reaction at a temperature of about 0° C. and extracting the product by known method.

11. A process as claimed in claim 7, wherein latex grafting of natural or synthetic rubber with cardanol or phosphorylated cardanol comprises reacting CNSL, cardanol, phosphorylated cardanol, a cardanol emulsion, or a phosphorylated cardanol emulsion with latex, in the presence of an initiator, at a temperature in the range of 25-30° C. for a period of about 24 hrs, followed by coagulating the resultant grafted rubber, drying in vacuum, at a temperature of 70-100° C. and finally extracting the grafted rubber with an organic solvent.

12. A process as claimed in claim 11, wherein the organic solvent used is methanol.

13. A process as claimed in claim 7, wherein the free radical initiator used is selected from benzoyl peroxide and ammonium per sulphate.

14. A process as claimed in claim 7, wherein the natural rubber used is cis-1,4 polyisoprene rubber.

15. A process as claimed in claim 7, wherein the synthetic rubber used is selected from the group consisting of styrene butadiene rubber, poly chloroprene rubber, poly butadiene rubber, and butadiene acrylonitrile rubber.

16. A process as claimed in claim 7, wherein the cardanol used is cardanol isolated from cashew nut shell liquid (CNSL) or commercially available cardanol.

17. A process as claimed in claim 7, wherein the grafting attained is in the range of 10-60%.

* * * * *